United States Patent Office 3,483,812
Patented Dec. 16, 1969

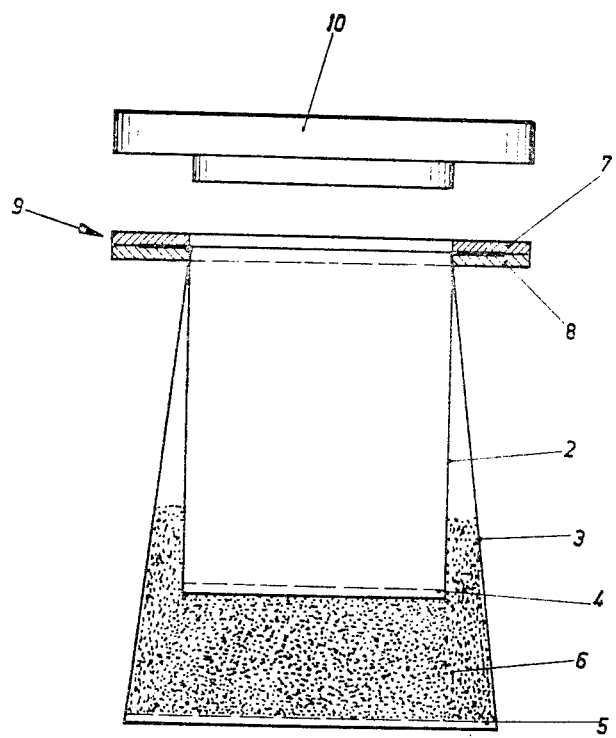
INVENTORS
Erich Gast &
Hans Wege

3,483,812
COFFEE-FILTER
Erich Gast, Frankfurt am Main-Oberrad, and Hans Wege, Wachenbuchen-Hohe Tanne, Germany, assignors to Wilhelm Kuhn, OHG, Hanau am Main, Hesse, Germany
Filed May 22, 1967, Ser. No. 640,150
Int. Cl. A47j 31/06
U.S. Cl. 99—295                                      1 Claim

ABSTRACT OF THE DISCLOSURE

A filter bag is partly filled with a measured amount of coffee. A liquid-permeable receiver closes the open top end of said filter bag. A frame is secured to and surrounds said receiver.

---

This invention relates to an apparatus for extracting and filtering coffee.

It is known to extract and filter coffee with the aid of an open-topped filter unit, which is placed on a coffee pot and contains an insert provided with filter paper. The desired amount of ground coffee is measured and placed into the filter insert. As the ground coffee swells in contact with hot water, time must be allowed for such swelling in pouring the boiling water into the filter unit before the rest of the extracting water may be poured. This process does not only take much time but has a number of further disadvantages, which are particularly inconvenient in gastronomy.

For instance, the filter unit must be cleaned. The handling of the ground coffee is left at the discretion of the staff and ground coffee can be stolen or become contaminated. The filtered coffee must be stirred before it is served because the last runnings of coffee are weaker than the first ones. Hot water remains for a prolonged time in the cold filter unit and flows from it into the cold pot so that the coffee is no longer hot when it is served. The assembly consisting of the pot and the filter unit on top thereof has an elevated center of gravity; when it turns over, near-by persons may become scalded. Having a wide open top, the filter unit permits the flavor to be lost.

All these disadvantages are eliminated in the apparatus according to the invention by a filter bag, which contains a measured amount of ground coffee and which is secured to an insert frame and has part of its space unfilled, said insert frame surrounding a hot water receiver which closes the bag.

The frame to which the filter bag and the hot water receiver are secured consists suitably of a bipartite ring, which fits on the rim of the coffee pot and the two parts of which enclose between them the rims of the bags and of the hot water receiver.

The filter bag is filled by a machine with a measured amount of ground coffee and with the aid of the frame is suspended in the pot so that the annular frame rests on the rim of the cup or pot. When boiling water is now poured into the receiver, which is surrounded by the frame, the water will flow directly onto the ground coffee in the bag so that the extraction begins. The ground coffee floats on the boiling water and is extracted at the same time because the boiling water surrounds every particle of coffee. The liquid thus prepared is filtered and flows as coffee beverage into the pot. As the coffee beverage rises in the pot which contains the bag, a second extracting process is performed so that all substances which contribute to the flavor of the coffee beverage are completely extracted from the ground coffee.

Two extracting steps and one filtering step are thus performed at the same time so that the coffee is prepared within much shorter time. Besides, the ground coffee is extracted to such a high degree that the required amount of ground coffee can be reduced by at least 20%.

As the swelling and percolating times are eliminated and at least two and during part of the time even three operations are performed at the same time, the extracting and filtering process is very fast.

The flavor cannot escape if the annular frame is covered by the lid of the coffee pot or a special cover as soon as the boiling water has been poured. The action of removing the device out of the coffee beverage before the latter is served acts at the same time to agitate the coffee beverage so that it need no longer be stirred.

The device according to the invention enables the manufacture of packages containing measured amounts of coffee for use in gastronomy, offices, households, factory canteens on camping grounds, and of exhibitions and other places attracting a large number of people.

To manufacture the device according to the invention, a tube is made from heat-sealable filter paper or synthetic fiber material. This tube is closed at the bottom by heat-sealing and is filled with a measured amount of ground coffee. The hot water receiver consisting of the same material as well as the top rim of the bag are heat-sealed to the annular frame. This operation results in a tightly sealed, discardable coffee package, which can be used as an extracting and filtering device. The advantages of the apparatus according to the invention are apparent from the following comparison:

| Conventional Filtering Process | Quick Filtering Process |
| --- | --- |
| (1) Utilization of ground coffee: About 80%. | (1) Utilization of ground coffee: About 95%. |
| (2) Process steps:<br>(a) Extracting;<br>(b) Filtering. | (2) Process steps:<br>(a) Extracting;<br>(b) Filtering;<br>(c) Extracting. |
| (3) Time required—About seven minuted for four cups:<br>(a) Place filter unit on pot;<br>(b) Take filter paper from package and place it into filter unit;<br>(c) Fill in ground coffee;<br>(d) Pour water for swelling;<br>(e) Allow 30 seconds for preswelling;<br>(f) Pour water for 10 seconds;<br>(g) Allow 60 seconds for percolation;<br>(h) Remove filter unit;<br>(i) Stir;<br>(k) Remove filter paper and spent coffee residue;<br>(l) Rinse filter unit and stow it away;<br>(m) Stow away the coffee package. | (3) Time required—About four minutes for four cups:<br>(a) Insert extracting and filtering device;<br>(b) Pour in water;<br><br>(c) Place cover on top;<br>(d) Remove extracting and filtering device. |
| (4) Preservation of flavor during filtering: None. | (4) Preservation of flavor during filtering: 90%, if cover is used. |
| (5) Maintained temperature: 65° C. | (5) Maintained temperature: 91° C. |
| (6) Control of strength of coffee: Control of strength of coffee is difficult because the flow of the water through the filter cannot be interrupted. | (6) Control of strength of coffee: Everyone controls the strength of his or her coffee by removing the filter bag when this is desired. |

A preferred embodiment of the invention is shown diagrammatically and partly in longitudinal section on the drawing.

A liquid-permeable hot water receiver 2 and a bag 3 of heat-sealable filter paper are shown on the drawing. Heat sealed seams are indicated at 4 and 5. The bag 3 contains a portion 6 of ground coffee. The rims of the bag 3 and of the receiver 2 are adhered between parts 7 and 8 of an annular frame 9. The frame 9 is placed on the rim of the coffee pot. When the hot water has been poured into the receiver, the frame 9 is closed by a cover 10.

What is claimed is:

1. A device for extracting and filtering coffee, which comprises an outer filter bag partly filled with a measured amount of ground coffee and formed of heat-sealable filter paper, said outer filter bag being generally of cylindrical configuration having a larger bottom end and being closed across said larger end by heat sealing to retain the coffee therein, an inner liquid permeable receiver closing the open top end of said filter bag, and lying within said filter bag, said receiver being similarly formed of heat-sealable filter paper and of the same shape but of less length to overlie the coffee, said receiver being generally of cylindrical sleeve configuration and closed across its lower end by heat sealing, two superimposed relatively rigid annular members, the open ends of both of said bags and their rims being joined by adhesion between the superimposed annular members, said annular members and said bags providing a frame with a circular opening for receiving liquid, and a cover removably carried by the frame and enclosing said opening.

References Cited

UNITED STATES PATENTS

| 1,977,818 | 10/1934 | Brodersen | 210—455 |
| 2,615,384 | 10/1952 | Ranz | 99—295 X |
| 3,199,437 | 8/1965 | Nelsen | 99—295 X |

FOREIGN PATENTS 902,986  1/1945  France.

SAMIH N. ZAHARNA, Primary Examiner

U.S. Cl. X.R.

210—282, 476